United States Patent

Tanner et al.

[11] Patent Number: 5,768,933
[45] Date of Patent: Jun. 23, 1998

[54] MOTION CONVERTER FOR CONVERTING ROTATION INTO TO-AND-FRO DISPLACEMENT

[75] Inventors: Peter Tanner; Daniel Herzog, both of Bubendorf, Switzerland

[73] Assignee: Synthes, Paoli, Pa.

[21] Appl. No.: 718,487

[22] PCT Filed: Feb. 28, 1995

[86] PCT No.: PCT/CH95/00044

§ 371 Date: Feb. 12, 1996

§ 102(e) Date: Feb. 12, 1996

[87] PCT Pub. No.: WO96/27093

PCT Pub. Date: Sep. 6, 1996

[51] Int. Cl.⁶ .............................. F16H 21/52; B27B 19/00
[52] U.S. Cl. .................................. 74/48; 128/317; 30/218; 30/392
[58] Field of Search ................................... 74/48, 47, 50, 74/49; 128/310, 317; 30/218, 219, 220, 392

[56] References Cited

U.S. PATENT DOCUMENTS

| | | | |
|---|---|---|---|
| 2,439,262 | 4/1948 | Nalbach et al. | 74/48 |
| 3,365,963 | 1/1968 | Happe | 74/47 |
| 3,505,733 | 4/1970 | Holden | 74/47 |
| 3,905,105 | 9/1975 | Tuke | 30/393 |
| 3,977,289 | 8/1976 | Tuke | 83/835 |
| 4,827,615 | 5/1989 | Graham | 74/48 |
| 5,237,884 | 8/1993 | Seto | 74/42 |

FOREIGN PATENT DOCUMENTS

| | | |
|---|---|---|
| 0 269 564 | 6/1988 | European Pat. Off. . |
| 650 678 | 9/1937 | Germany . |
| 808 873 | 7/1951 | Germany . |

*Primary Examiner*—Charles A. Marmor
*Assistant Examiner*—David M. Fenstermacher
*Attorney, Agent, or Firm*—Pennie & Edmonds LLP

[57] ABSTRACT

A motion converter comprising a drive head mounted eccentrically onto a drive shaft, and which is eccentrically displaced when the drive shaft rotates. The converter additionally comprises a displaceable transmission element and a displaceable tool holder holding a tool. The transmission element and tool holder are moved to-and-fro when the drive shaft is rotated. The excursion of the to-and-fro motion is adjustable by pivot means, preferably a first pivot pin, displaceably affixed to a housing and connecting the transmission element to the housing.

13 Claims, 2 Drawing Sheets

5,768,933

MOTION CONVERTER FOR CONVERTING ROTATION INTO TO-AND-FRO DISPLACEMENT

TECHNICAL FIELD

The invention concerns a motion converter for changing rotational motion to reciprocal angular motion. This apparatus is particularly useful in sawing tools.

BACKGROUND ART

Motion converters converting rotation into to-and-fro displacement have long been known. Illustratively, they are used for motor-driven surgical saws, though they are also applicable to many other industrial fields.

A motor-driven surgical saw comprising such a motion converter is disclosed, for instance, in U.S. Pat. No. 3,905, 105 and 3977289. The saw is fitted with an elongated saw-blade holder bearing a saw blade and supported in a saw housing. The holder is linked at an end away from the saw blade to a cam pin connected to a drive motor shaft. At its middle, the saw-blade holder is supported in the saw-blade housing so as to be pivotable and longitudinally displaceable by a guide pin and, when the motor is running, it is pivoting. The saw blade rigidly joined to the saw-blade holder thereupon carries out to-and-fro motion a fixed excursion predetermined by the design of the motion converter.

This known motion converter has the drawback that the excursion of the to-and-fro motion cannot be changed in a simple manual manner but instead at best requires refitting the motion converter. In many instances such as during surgery, however, a simple, manually implemented change would be advantageous.

SUMMARY OF THE INVENTION

Accordingly an object of the present invention is to create a motion converter which allows adjustment of the excursion of the to-and-fro motion produced by the motion converter without the need for refitting the surgical device.

This problem is solved by the features of the inventive motion converter, which includes a tubular housing, a tool holder pivotally mounted in the housing at a pivot point and including a tool which extends away from the pivot point and out of the housing, and a holder head which extends away from the pivot point and into the housing, and a transmission element pivotably mounted in the housing. The transmission element has a first end which receives the holder head of the tool holder, and a second end which is adapted to receive an eccentrically rotating drive head such that the transmission element pivots back and forth due to eccentric rotation of the drive head and transfers such motion to the holder head of the tool holder which in turn imparts reciprocal angular motion to the tool. The transmission element can be positioned at different locations between the drive head and holder head to adjust the amount of reciprocal angular motion of the tool.

In the invention, the transmission of motion is advantageously implemented by a rocking fork of which the center of rotation can be shifted between the drive and the driven assembly along the longitudinal axis, i.e., the x axis. Thereby, the lever ratio is adjusted and consequently a change in angular position takes place on the driven side. This operation may be likened to an electric amplifier which is able to equally raise and lower a base signal.

BRIEF DESCRIPTION OF THE DRAWINGS

Invention is illustratively elucidated in relation to the drawings wherein.

DETAILED DESCRIPTION OF THE PREFERRED EMBODIMENT

Figure 1:
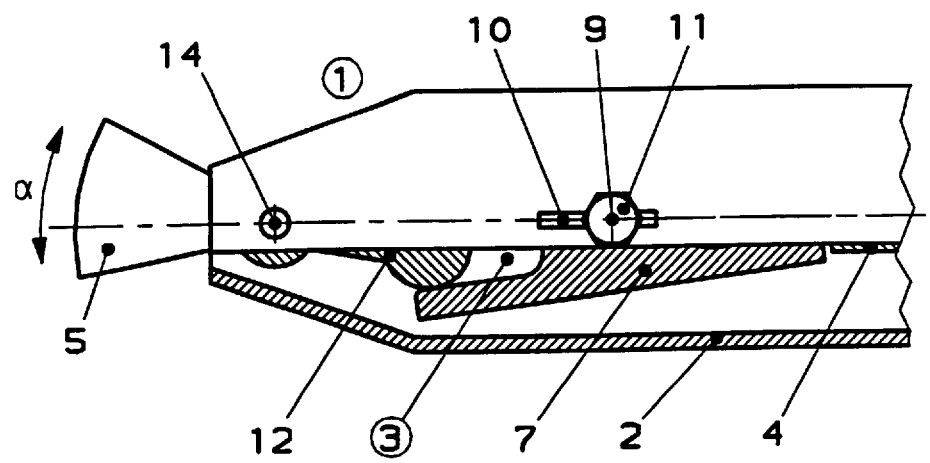
FIG. 1 is a partial view of an operational system with a motion converter of the invention.

The same components are denoted by the same references wherever they appear in the Figures and therefore all Figures are discussed jointly hereunder.

FIGS. 2 through 5 show a motion converter 3 of the invention in various states. This motion converter 3 comprises a drive shaft 4 connecting the converter to a motor, not shown, and bearing a drive head G. A transmission element 7 is connected by first pivot pin 9 to a housing 2, and a tool holder 12 is connected by a second pivot pin 14 to the housing and comprises holder head 13. An appropriate tool 5 is mounted on tool holder 12.

FIG. 1 illustratively shows a tool-side end of a motor-driven operational or surgical instrument 1, in this case a saw with the motion converter 3 of the invention but only shown in part. FIG. 1 is a top view. The upper part of FIG. 1 is a top view, the lower part is a section at the level of the center axis of the surgical instrument I. This surgical instrument 1 comprises a housing 2 which advantageously is screwed together from a housing base and cover (these components are not shown separately herein). The lower part of FIG. 1 shows several components of motion converter 3, namely drive shaft 4, transmission element 7, the toolholder 12, the second pivot pin 14, a nut 11 allowing to screw tight the (omitted) first pivot pin 9 into a straight milling (shown) 10 in the housing 2 and the saw 5 which is the tool in the operational system 1. The schematics of FIGS. 2 through 5 of the motion converter 3 of the invention must be considered for a good understanding of FIG. 1.

FIGS. 2 through 5 show in detail how the motion converter 3 of the invention converts the rotation from the omitted motor into a tool to-and-fro motion denoted by the angle a of which the magnitude is adjustable.

The motor-driven rotation of drive shaft 4, of which only a tool-side end is shown, can be converted by the drive head 6 inserted in said shaft 4 into eccentric rotation. Transmission element 7 displaceably links drive head 6 with displaceable toolholder 12 bearing tool 5. Transmission element 7 on one hand and toolholder 12 together with the tool on the other hand jointly carry out mutually opposite to-and-fro motions as soon as the motor is running. In the process, the change in position of the transmission element 7 relative to the drive head 6 allows changing the excursion of the to-and-fro motion of the tool 5. Details are provided below.

Figure 2:
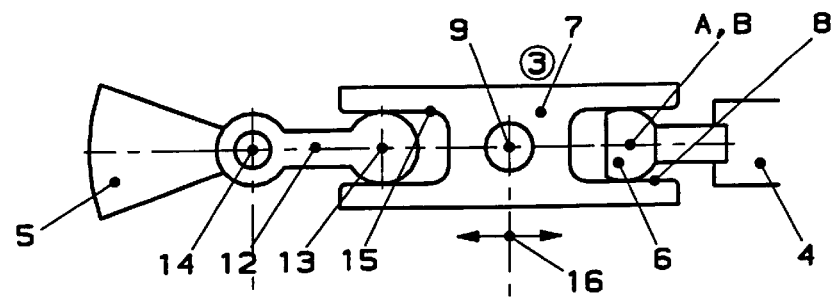
FIG. 2 is a schematic view of a motion converter of the invention in a first position.
Figure 3:
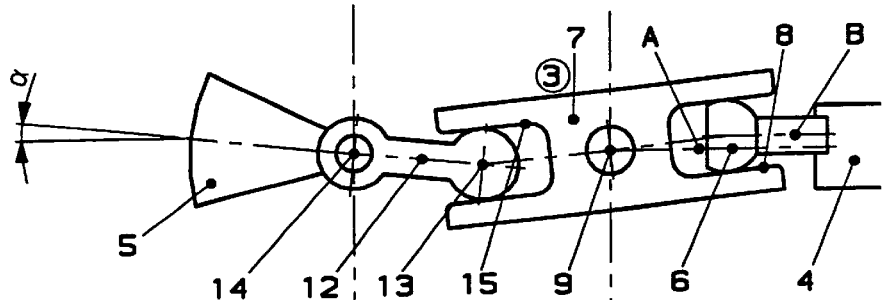
FIG. 3 is a schematic view of the motion converter of FIG. 2 in a second position.
Figure 4:
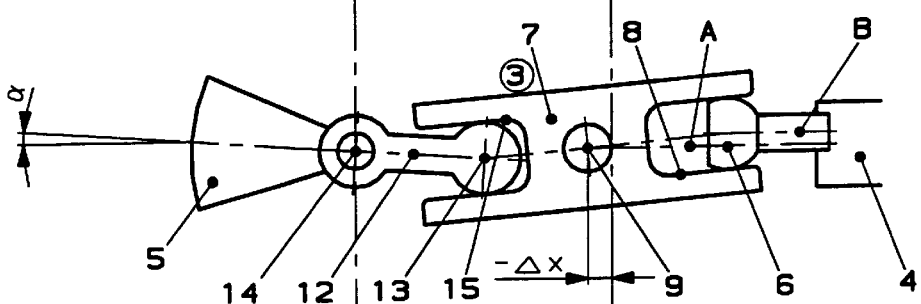
FIG. 4 is a schematic view of the motion converter of FIG. 2 in a third position.
Figure 5:
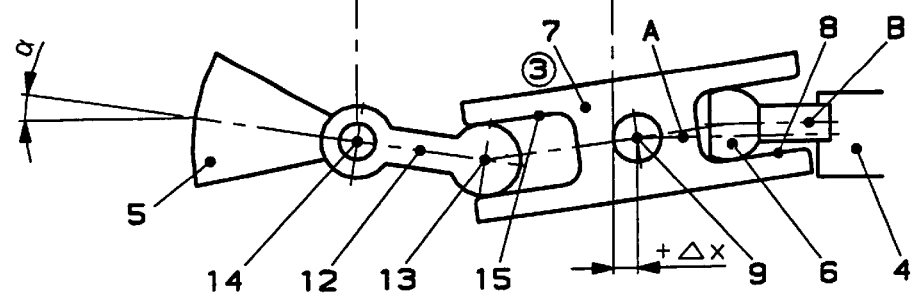
FIG. 5 is a schematic view of the motion converter of rig. 2 in a fourth position.

At its end, drive shaft 4 supports drive head 6. Said drive head 6 comprises a drive-head axis B running parallel to but laterally offset from a drive axis A of the drive shaft 4. When drive shaft 4 rotates, drive head 6 rotates eccentrically about drive axis A. In FIG. 2 the drive-head axis B is at the level of the drive axis A and in this two-dimensional schematic the drive-head axis B and the drive axis A are then coincident as shown. In FIGS. 3 through 5, the drive shaft 4 has been rotated and the drive-head axis B is next to the drive axis A, and accordingly in these Figures it will not coincide with the drive axis A and is shown separately.

The transmission element 7 is connected on its tool side with drive head 6 and further it is displaceably connected through the first pivot pin 9 with housing 2. The transmission element 7 is fitted in such a manner on the drive side into eccentrically driven drive head 6 that the rotations of the drive shaft 4 can be converted into an angular motion of the transmission element 7 about first pivot pin 9. For that purpose, transmission element 7 is fitted on the drive side with a first jaw 8 entered by the drive head 6. The sides of transmission element 6 running toward the insides of the first jaw 8 are spherical. The width of the jaw of transmission element 7 corresponds to the diameter of the spherical portion of drive head 6 and, as a result, drive head 6 only touches the insides of first jaw 8 at two points in any rotational position of drive shaft 4. The width of first jaw 8 is at least as large as the diameter of the circle followed by the center of spherical drive head 6 on account of its eccentricity relative to the drive axis A in one revolution of drive shaft 4.

The first pivot pin 9 is displaceable together with transmission element 7 inside a slot or milling 10 in the housing 2. In the course of such displacements, the position of first jaw 8 of transmission element 7 is simultaneously changed relative to drive head 6 and as a result the excursion of the angular motion of transmission element 7 is changed relative to drive axis A on account of the eccentric displacement of drive head 5. The position of first pivot pin 9 in the housing 2 can be adjusted in the milling 10 for instance using at least one thread and a nut 11, for instance a clamping nut. However, first pivot pin 9 also may be adjusted using a motor. If the position of first pivot pin 9 is shifted by the amount +x toward the drive side, then the angular displacement of transmission element 7 will be enlarged to an angle a for the same rotation of drive shaft 4 (see FIGS. 3 and 5), whereas if said position is shifted by an amount x toward the tool side, then the angular displacement will be reduced to the angle a (FIGS. 3 and 4). The magnitude of the angular displacement of the transmission element 7 therefore can be adjusted by shifting the first pivot pin along the milling 10 in the housing 2.

A tool 5, in this instance a saw blade, is mounted on the tool side into toolholder 12 in turn connected at the tool side of the transmission element 7. Moreover, at the tool side, toolholder 12 is rotatably connected through a second pivot pin 14 to a fixed pivot point on the housing 2. On its drive side, tool holder 12 is fitted in such manner into transmission element 7 that the angular displacement of transmission element 7 causes an opposite angular displacement of tool holder 12. For that purpose, tool holder 12 comprises a holder head 13 entering a second jaw 15 on the tool side of transmission element 7. The sides of the holder head 13 running toward the insides of first jaw are cylindrical. The width of the jaw of the transmission element 7 corresponds to the diameter of the cylindrical part of the holder head 13. Tool holder 12 together with its tool 5 therefore carries out mutually opposite to-and-fro motions of which the excursions are proportional to the angular displacements of transmission element 7. Accordingly, the excursion of the to-and-fro motion of the tool 5 also is adjustable by shifting first pivot pin 9 along the milling 10 in housing 2. Thus, the motion converter 3 makes it possible to convert the rotation of the drive shaft 4 into a to-and-fro motion of the tool 5, the excursion or amount of this to-and-fro motion being adjustable merely by shifting the position of the first pivot pin 9 at housing 2. Such adjustment may be implemented by manually moving the first pivot pin 9 along the slot or milling 10. This movement can also be implemented using a motor where so desired.

Obviously some components of an operational, for instance surgical system also may be designed differently, provided that the system has the features of the invention as defined in the appended claims.

What is claimed is:

1. A motion converting apparatus for converting rotational motion to angular reciprocal motion which comprises:

a tubular housing defining a longitudinal slot therein;

a tool holder pivotally mounted in the housing at a pivot point and including a tool which extends away from the pivot point and out of the housing, and a holder head which extends away from the pivot point and into the housing; and a transmission element pivotally mounted in the housing by means for pivotally mounting said element and having a first end which receives the holder head of the tool holder, and a second end which is adapted to receive an eccentrically rotating drive head such that the transmission element pivots back and forth due to eccentric rotation of the drive head and transfers such motion to the holder head of the tool holder which in turn imparts reciprocal angular motion to the tool, wherein the transmission element can be positioned at different locations between the drive head and holder head by moving the pivot mounting means along the slot to adjust the amount of reciprocal angular motion of the tool.

2. The apparatus of claim 1 wherein the transmission element is connected to the housing by a pivot pin.

3. The apparatus of claim 1 which further comprises a clamping member for fixing the position of the transmission member pivot pin in the housing slot.

4. The apparatus of claim 1 wherein the position of the transmission member is automatically fixed by a motor so that the adjustment of the excursion of the tool can be made in a continuous manner.

5. The apparatus of claim 1 wherein the transmission element includes a first jaw for receiving the drive head, said first jaw having an opening which corresponds to the size of the drive head.

6. The apparatus of claim 5 wherein the opening of the first jaw is at least as large as the circular path that is created by rotation of the eccentric drive head.

7. The apparatus of claim 5 wherein the transmission element includes a second jaw for receiving the tool holder head, said second jaw having an opening which corresponds to the size of the tool holder head.

8. The apparatus of claim 7 wherein the housing, the transmission element and the first and second transmission element jaws are cylindrical.

9. The apparatus of claim 8 wherein the housing includes a tapered portion at the position where the tool extends out of the housing.

10. The apparatus of claim 8 wherein the transmission element comprises a rocking fork where the first and second jaws form each end of the fork, with the pivotably mounted including a pivot pin which can be adjustably positioned along the longitudinal axis of the housing.

11. The apparatus of claim 1 wherein the tool holder is connected to the housing at the pivot point by a pivot pin in order to provide a fixed distance between the tool holder head and the eccentric drive head.

12. The apparatus of claim 1 wherein the tool is a saw blade.

13. A motion converting apparatus for converting rotational motion to angular reciprocal motion which comprises:

a tubular housing defining a longitudinal slot therein;

a tool holder pivotally mounted in the housing at a pivot point and including a tool which extends away from the pivot point and out of the housing, and a holder head which extends away from the pivot point and into the housing; and a transmission element pivotally mounted by a pivot pin in the housing and having a first end which receives the holder head of the tool holder, and a second end which is adapted to receive an eccentrically rotating drive head such that the transmission element pivots back and forth due to eccentric rotation of the drive head and transfers such motion to the holder head of the tool holder which in turn imparts reciprocal angular motion to the tool, wherein the transmission element can be positioned at different locations between the drive head and holder head by moving the pivot pin along the slot to adjust the amount of reciprocal angular motion of the tool.

* * * * *